A. A. SCOTT.
APPARATUS FOR TREATING BRICK.
APPLICATION FILED MAY 31, 1912.

1,054,040.

Patented Feb. 25, 1913.
6 SHEETS—SHEET 1.

Witnesses:-
Jas. H. Anderson
R. C. Fitzhugh

Inventor
Alexander A. Scott
By Mauro, Cameron, Lewis & Massie
Attorneys

A. A. SCOTT.
APPARATUS FOR TREATING BRICK.
APPLICATION FILED MAY 31, 1912.

1,054,040.

Patented Feb. 25, 1913.
6 SHEETS—SHEET 3.

A. A. SCOTT.
APPARATUS FOR TREATING BRICK.
APPLICATION FILED MAY 31, 1912.

1,054,040.

Patented Feb. 25, 1913.
6 SHEETS—SHEET 6.

Witnesses:
Jas H. Anderson
R. C. Fitzhugh

Inventor
Alexander A. Scott,
By
Mauro, Cameron, Lewis & Massie
Attorneys

UNITED STATES PATENT OFFICE.

ALEXANDER A. SCOTT, OF KNOXVILLE, TENNESSEE.

APPARATUS FOR TREATING BRICK.

1,054,040. Specification of Letters Patent. Patented Feb. 25, 1913.

Application filed May 31, 1912. Serial No. 700,856.

*To all whom it may concern:*

Be it known that I, ALEXANDER A. SCOTT, a citizen of the United States, and a resident of Knoxville, Tennessee, (whose post-office address is 122 Scott street, Knoxville, Tennessee,) have invented a new and useful Apparatus for Treating Brick, which invention is fully set forth in the following specification.
This invention relates to the art of brickmaking, and has for its object to provide efficient and continuously operating apparatus for economically handling, drying, burning and cooling bricks.
In burning bricks according to the present invention, dried bricks are placed in a kiln-chamber, preferably mounted upon suitable trucks moving on a track or way, which may be, and preferably is, extended through a closed tunnel. When operating to the best advantage, a series of said kiln-chambers are connected together in a train, which is advanced step by step through said closed tunnel, the said tunnel being spaced sufficiently away from the train of kiln-chambers to form a drying chamber, preferably above the train of kiln-chambers, and the burning operation takes place at a point in the train of kiln-chambers intermediate the ends of the train, preferably near the middle portion thereof. Convenient means are provided for the introduction of fuel into a suitably arranged combustion chamber constructed within each of the kiln-chambers.
The rear end of one kiln-chamber is connected to the forward end of the succeeding kiln-chamber in the train by a suitable flue or flues, preferably so arranged that the products of combustion are compelled to pass, and be distributed equally between all of the bricks contained in each kiln-chamber. This is preferably secured by constructing the combustion chamber in the front of each kiln-chamber with its discharge opening at or near the top of the kiln-chamber, and with the flues which connect with the next succeeding chamber in the train located at or near the bottom of the kiln-chamber, and leading into the combustion chamber of the succeeding kiln-chamber.

The bricks are burned at the point where the fuel is admitted to the kiln-chamber, and the hot products of combustion are preferably passed in an indirect or zigzag line through the several kiln-chambers to the rear chamber of the train, and thence to a suitable outlet, an artificial draft being employed to effect the passage of the gases of combustion rearward. When the bricks in the middle kiln-chamber or chambers have been sufficiently burned, the train is advanced the length of one kiln-chamber, a new chamber with dried (and preferably hot) bricks is added to the rear of the train and introduced into the tunnel as the train is advanced. By this means, the hot gases of combustion act to burn the bricks in the kiln-chambers where combustion actually takes place, and as the gases are drawn rearward through the train, serve to heat up the bricks in that portion of the train to the rear of the point where actual burning takes place, so that when they reach the point of actual combustion, they are already well heated and the actual burning operation can be thus performed much more rapidly and economically. In this way, the bricks are passed through a heating up, and then through a burning zone. Having been burned, the kiln-chambers containing the highly heated burned bricks are advanced step by step through the tunnel beyond the burning station, as additional kiln-chambers containing dried bricks are added to the rear of the train at the initial end of the inclosing tunnel.

Each of the kiln-chambers is provided with an outlet or outlets, preferably located in the top thereof, and closed by a suitable valve or cover during the heating up and the burning steps. After the kiln-chamber has passed the burning station, however, the valves or covers of these outlets are opened, and cold air is introduced or allowed to enter at the forward end of the train at or near the outlet of the tunnel, which air passes between the heated bricks, and cools them by absorbing the heat therefrom, and then passes through the outlets in the kiln-chambers into the space of the surrounding tunnel. The passage of this air over the burned bricks is secured by an artificial draft.

Preferably the artificial draft, which moves the hot products of combustion from the burning station rearward through the train to heat up the bricks previous to burning, is secured by a suction draft located at the rear end of the train or initial end of the tunnel. This may be in the nature of a suction fan or suitable stack, or any other means for effectively producing a suction draft. The artificial draft of air over the burned bricks, however, may be a forced draft, such as a fan or any other means for forcing the air into the front end of the train and through the kiln-chambers. This forced draft acts to force the cooling current of air between the hot bricks and outward through the outlets in the kiln-chambers, and also may be used to supply the requisite amount of air to support combustion at the combustion station.

The inclosing tunnel is preferably of sufficient length to permit the bricks which are introduced at the rear end of the train (the initial end of the tunnel) to become properly heated up by the time they reach the combustion station, and also to permit the burned bricks to be cooled by the time they reach the exit end of the tunnel at the forward end of the train, to be removed therefrom preferably in unit groups, as hereinafter described. The kiln containing the burned bricks at the exit end of the tunnel will preferably be still hot or warm.

When a kiln-chamber is attached to the train at the initial end of the tunnel, the kiln-chamber is not only supplied with dried bricks within the kiln-chamber, but preferably there is also a quantity of wet bricks or bricks to be dried on top of the kiln-chamber. Preferably, these bricks are in unit groups, which groups are also preferably of such size or contain such a number of bricks that one or more of the groups will fill or charge the kiln-chamber when they are dried and removed from the top of the kiln-chamber and placed therein, as will be hereinafter described.

Preferably, each of the kiln-chambers has a forward wall entirely closing the forward end of the kiln-chamber, except for the flue or flues whereby it is connected to the kiln-chamber immediately preceding it in the train, as before mentioned. The rear end of each of the kiln-chambers may be, and preferably is open, that is, without any end wall (this opening being for the purpose of filling and emptying the chamber). When the several kiln-chambers are butted together end to end to form the train, the closed end of one kiln-chamber is joined to the open rear end of the immediately preceding kiln-chamber, thereby effectively closing the said opening, but leaving communication between the chambers by reason of the flues. Suitable construction is provided for effectively sealing the joints between the kiln-chambers when the chambers are coupled together in any suitable manner to form a continuous train.

The hot products of combustion are drawn rearward by the suction draft within the several kiln-chambers to the rear of the combustion station, and pass outward through the outlet in the rear end of the train. The closed joints under ordinary working conditions are intended to prevent the leakage of the gases of combustion from the kiln-chambers into the surrounding space of the tunnel to the rear of the combustion chamber; however, there may be more or less openings through the joints, but the suction draft prevents the exit of the gases of combustion through such openings. This is of particular importance, since the gases of combustion, if they come in contact with the wet bricks, would seriously injure the same, and materially reduce their appearance and market value. At the same time, while the hot products of combustion are retained within the kiln-chambers, the heat radiated from the top, sides and bottom surfaces of all the kiln-chambers of the train acts to heat up the air of the inclosing tunnel, and greatly assists in drying the bricks. The air forced into the rear end of the train at the exit end of the tunnel, and passing between the hot burned bricks, emerges through the outlets in the kiln-chambers into the space of the surrounding tunnel, after becoming highly heated through contact with the burned bricks, and this heated air, in conjunction with the air heated by radiation from the kiln-chambers serves to effectively dry the bricks on top of the kiln-chambers. It will thus be observed that the dried bricks within the kiln-chambers are continuously passed through a heating up, a burning and a cooling zone, and that the wet bricks on top of the kiln-chambers are simultaneously dried by the action of waste heat.

When the kiln-chamber having dried bricks within the same and wet or damp bricks on top of the same, is added to the rear end of the train at the initial end of the tunnel, and the train advanced the length of one kiln-chamber, the forward kiln-chamber of the train emerges from the exit end of the tunnel with hot dried bricks thereon, and with burned bricks therein. And since preferably, as above suggested, the bricks are placed in the kiln-chamber in unit groups, suitable means for handling the bricks in unit groups are provided, which remove the charge of bricks from within the kiln-chamber in one or more unit groups. This operation being performed by suitable apparatus, rather than removing the bricks singly by hand, the bricks can be removed while the kiln is still too hot to be entered by workmen, and hence the time that would otherwise be consumed in waiting for the kiln to cool is saved, as is also the heat retained by the kiln-walls. The dried bricks on top of the kilns are still quite hot, as is also the kiln-chamber, and since these bricks on top of the kiln-chamber have preferably been placed thereon in unit groups, the said unit groups are lifted bodily in one or more units by suitable apparatus and placed within the kiln through the open end thereof. Wet bricks are then placed upon the kiln-chamber, preferably in a unit group or groups, as before, and the kiln is then immediately returned to the initial end of the tunnel and attached to the rear end of the train, or the kiln may be charged or unloaded, and the bricks handled at any convenient place during the circuit of the kiln from the exit to the initial end of the tunnel, and the operation repeated. This has the advantage that the kiln-chamber and the bricks therein are started on the operation while still hot, and the heat and time that would be required to bring them up to this starting temperature if the kiln and the bricks were introduced cold, is thus saved.

A further and important advantage is secured by having the bricks and the kiln-chamber hot at the time they are introduced into the train, and subjected to the action of the gases of combustion. These gases carry a considerable amount of moisture which would be condensed on the bricks if they were cold. This moisture would take up a large amount of impurities carried by the gases of combustion, and when the moisture was again evaporated from the bricks as they were heated up, the impurities would remain on the burned bricks forming a white coating known in the art as "white wash." By having the bricks and kiln hot when first subjected to the action of the gases of combustion, no condensation of the moisture on the bricks takes place, and the deposit of impurities and resultant "white wash" is avoided.

A further advantage, due to the introduction of the hot kiln and hot bricks, lies in the fact that the train itself and the inclosing tunnel need not be as long as would be required if the bricks and kiln-chambers were introduced at the initial end of the tunnel in a cold state, so that the cost of the plant is thus materially reduced.

The inventive idea involved is capable of embodiment in a variety of mechanical structures, and for the purpose of illustrating the invention, I have shown one embodiment thereof in the accompanying drawings; but it is to be expressly understood that such drawings are only for the purpose of illustrating the invention, and are not intended to indicate that the invention is confined to the specific embodiment chosen for illustration. Furthermore, while I prefer to employ the several parts of the invention working together as a whole, it must not be understood that it is essential that all of such parts should be thus united into a complete apparatus, since many of the benefits of the invention can be secured by using certain portions of the apparatus while omitting other portions.

While I have described producer gas as the fuel, either gas, oil, coal (preferably powdered) or other suitable fuel may be employed.

Figure 6:
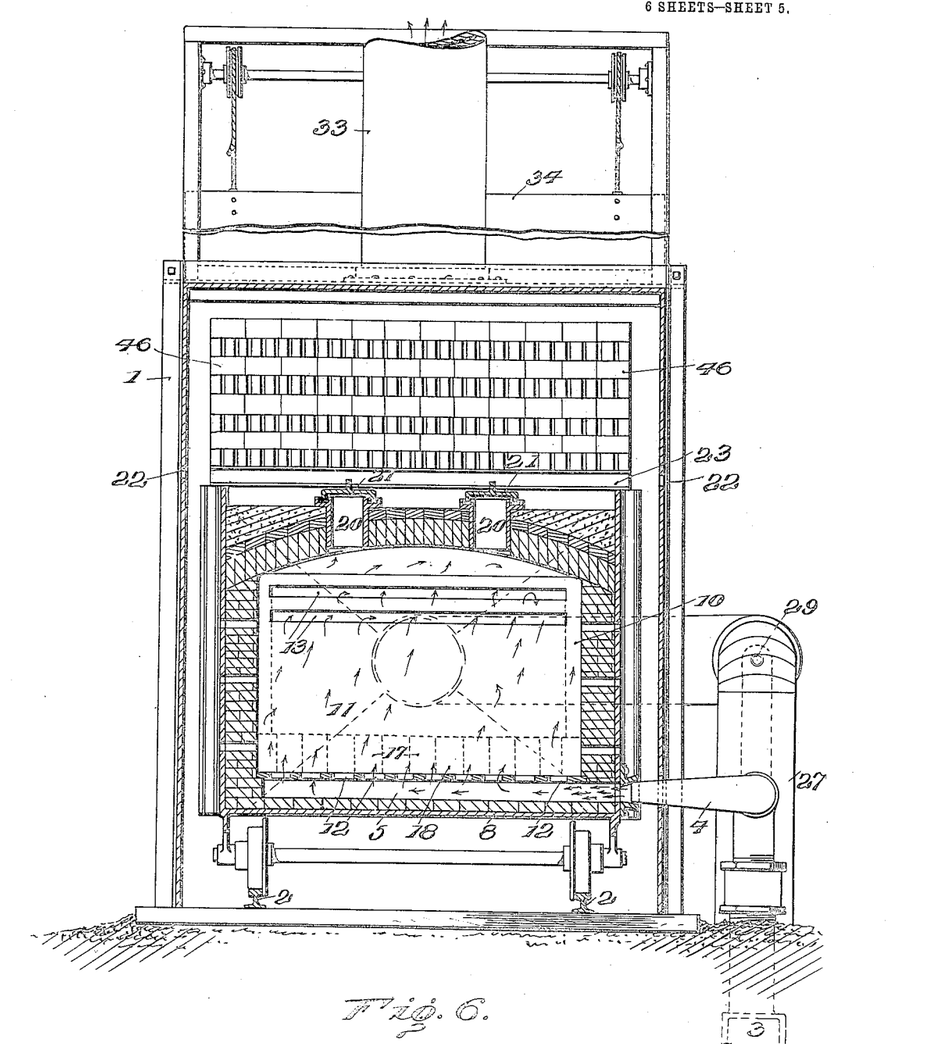
Fig. 6 is a transverse vertical section taken on the line 6—6 of Fig. 5.

Referring to these drawings, in which like reference numerals indicate like parts, 1 indicates an inclosing tunnel having a suitable track or way 2 extending longitudinally therethrough, and 3 is a combustion supply station located intermediate the ends of the tunnel and provided with any suitable or desired number (here shown as three) nozzles or other devices 4 for introducing the fuel through the walls of the tunnel 1 and of the kiln-chambers into the distributing ducts 5 of the kiln-chambers. A gas producer 6 is connected by a suitable conduit 7 with the fuel supply station. On the track 2 extending through the tunnel is a train of wheeled kiln-chambers 8, 8, of suitable refractory material. These kiln-chambers are preferably of the crown-kiln type (an oval crown is shown, but a fly crown may be used), as shown in cross-section in Fig. 6, and are closed at one end, shown in the present instance as the forward end, by an end closure wall 9, and are open at the other end. As here shown, the closed end is the forward end of the kiln-chamber, and the open end is the rear end thereof. Each of said kiln-chambers is provided with a flash wall 10 suitably spaced from the end wall 9 so as to form a combustion chamber 11 in communication with the distributing ducts 5 through ports or openings 12. This flash wall 10 in the present instance extends entirely across the kiln-chamber and from the bottom thereof upward, terminating short of the top or crown of the chamber, so as to leave a free communication between the top of the combustion chamber 11 and the upper portion of the kiln-chamber. If desired, this flash wall 10 may have flues or openings 13 formed therein near the top thereof, so as to permit a portion of the gases of combustion to pass into the kiln-chamber without passing over the top of the flash wall. There may be, and as here shown there is, a second wall 14 spaced from the flash wall 10, so as to leave a duct or passage 15 between the two walls, and near the bottom portion of this second wall 14, there is, or may be, provided one or more openings or flues 16, and the space 15 may be closed, or left open at its top and bottom as shown. Suitable brick supports are arranged within the kiln-chambers 8 for supporting the bricks to be burned. These supports may be, and preferably are, in the form of longitudinally arranged ribs 17 of refractory material suitably spaced apart so as to leave flues or ducts 18 between them. These ribs may be supported in any suitable way, and in the present instance are shown as resting upon the floors of the kiln-chambers, and the flues 18 between the ribs are or may be in open communication with the bottoms of the flues or ducts 15.

While in the present instance, the fuel distributing ducts or flues 5 are shown at the bottom and at the forward end of the kiln-chambers, this particular location is not essential, since they may be otherwise located and the combustion chamber correspondingly changed, but the arrangement shown is the one preferred.

Through the forward end wall of each of the kiln-chambers, a flue or flues 19 is or may be provided communicating, as in the present instance, with the bottom of the combustion chamber 11, and through the top or crown of the kiln-chambers air outlet flues 20 are formed, which are provided with suitable closures or covers 21. One or more of such outlet flues may be provided for each kiln-chamber, and as here shown, Fig. 6, there are two of such flues. The covers 21 may be removed or placed in position by means of suitable rods or hooks introduced through openings 22, 22, in the side walls of the tunnel 1.

Figures 9, 10:
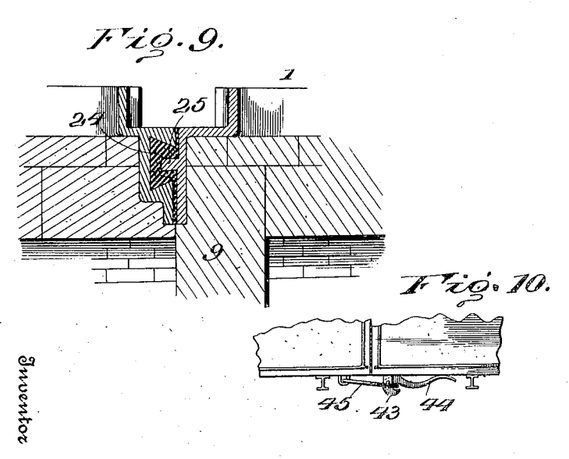
Fig. 9 is a detail showing the joint closure.
Fig. 10 is a detail showing the means for coupling the kiln-chambers together.

Extending transversely or longitudinally on the top of the kiln-chambers are suitably spaced supporting ribs 23 for carrying the wet bricks. The rear face or end of the inclosing walls of the kiln-chambers has formed therein a suitable depression 24 (Fig. 9), for the reception of suitable sealing plastic material, such as asbestos cement, and the forward or closed end wall of each kiln-section has a corresponding rib or projection 25 for entering the plastic material in the depression 24 when the kiln-chambers are butted together and coupled into the train, thus forming a male and female joint.

Located at the initial end of the tunnel 1 is a suitable suction draft apparatus, here shown as a suction fan 26, which is connected by a suitable duct 27 with a hood 28 of such shape and size as to cause its periphery, when brought into conjunction with the open rear end of the kiln-chamber 8 (Fig. 3) to enter the depression 24 and effectively close the joint between the hood and the kiln-chamber. This hood is mounted on a horizontal axis 29 (Fig. 1) so as to be capable of swinging in a vertical plane to lift it out of the way when a kiln-chamber is to be passed into the tunnel, as hereinafter described. The suction fan discharges through any suitable outlet, directly to the atmosphere or otherwise, as desired.

Arranged at the exit end of the tunnel is a suitable means, such as a fan 30, for producing a forced draft, which fan is connected by a suitable duct 31 with a hood 32, which extends across the rear end of the forward kiln-chamber in the train at the exit end of the tunnel. This hood 32 is of such size and shape as to cover the flues 19 leading into the combustion chambers 11, so that the air forced in by the fan 30 enters the kiln-chambers through the flues 19 and the combustion chambers 11, as will be readily understood.

Figure 3:
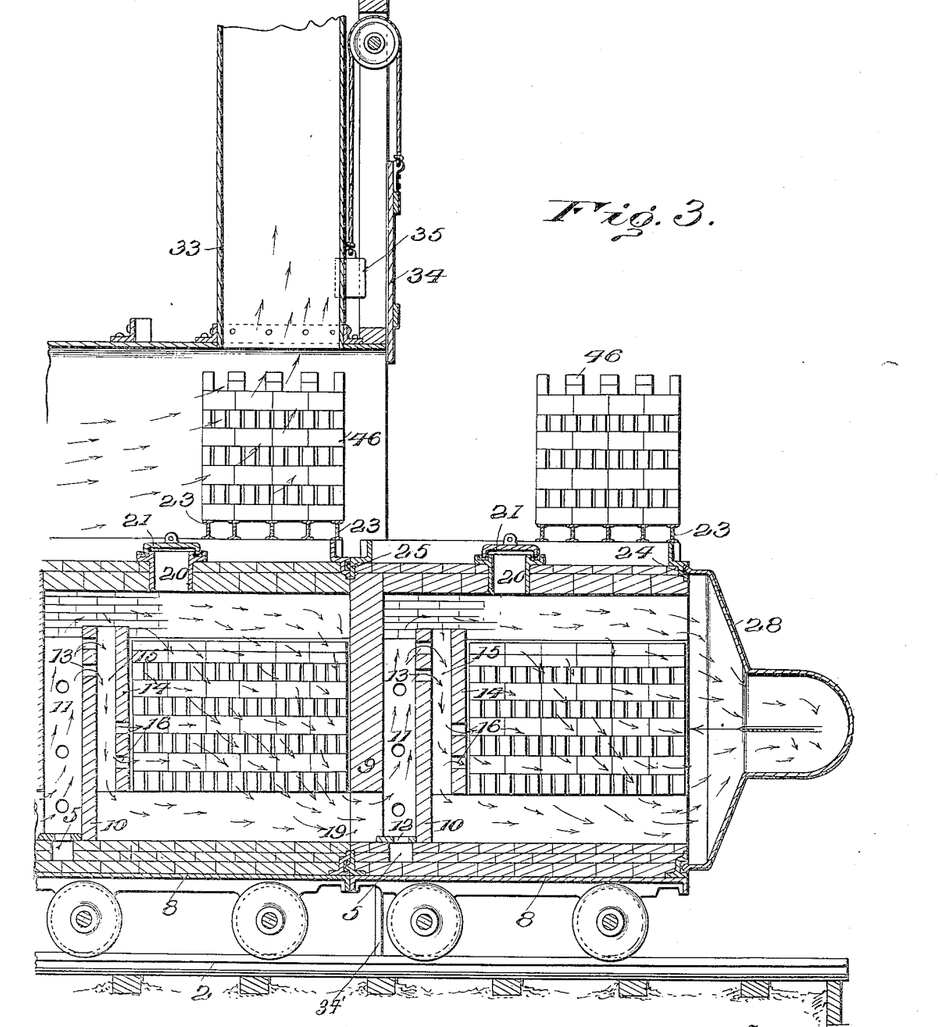
Fig. 3 is an enlarged vertical sectional detail of the rear end of the train of kiln-chambers entering the initial end of the tunnel.
Figure 4:
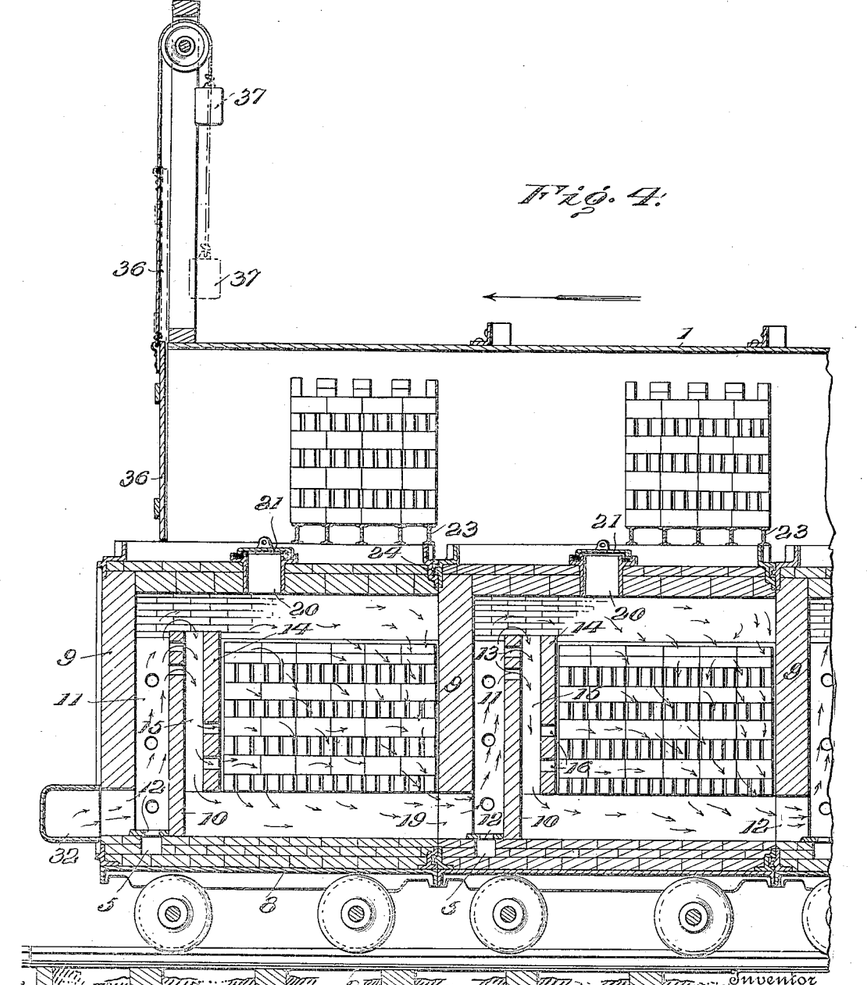
Fig. 4 is a like view of the forward end of the train of kiln-chambers at the exit end of the tunnel.
Figure 5:
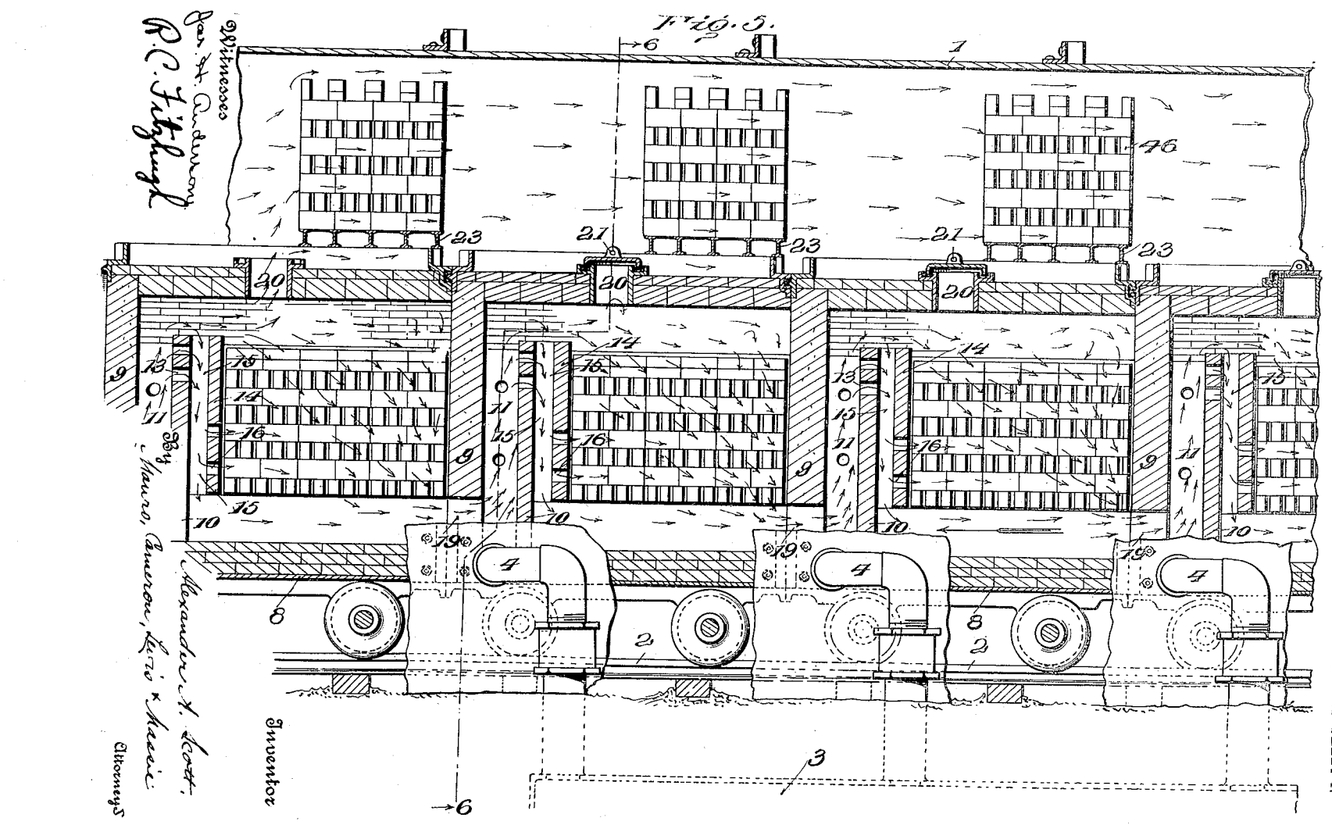
Fig. 5 is a vertical longitudinal section taken at the combustion station intermediate the ends of the tunnel.
Figure 7:
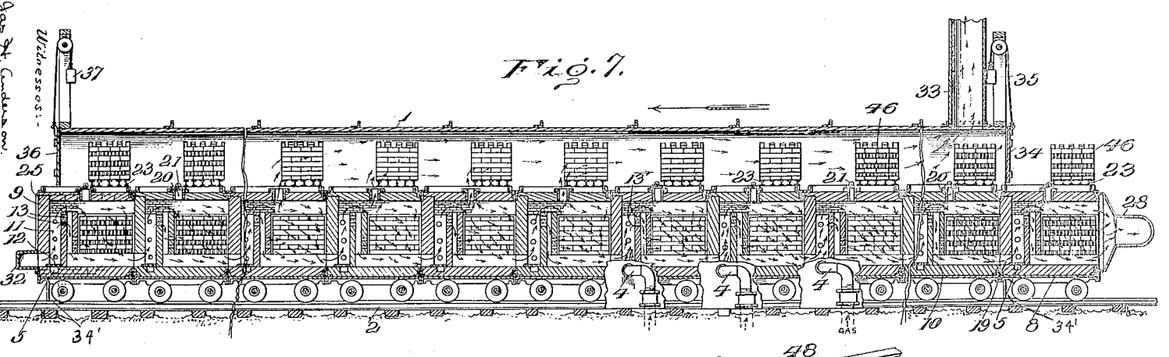
Fig. 7 is a central longitudinal section of the train of kiln-chambers and the tunnel.

The tunnel 1 is provided at or near its initial end with a draft outlet, here shown as a stack 33 (Fig. 3), and is provided at its initial end with a vertically adjustable gate or closure 34, preferably counterbalanced by a weight 35, and the rear or exit end of the tunnel is provided with a like closure or gate 36 and counterbalancing weight 37. When these gates are in their raised position, as shown in Figs. 3 and 4, they permit the passage of the kilns with the bricks on top thereof, and when the kilns have entered the tunnel, they are lowered and rest upon the upper surface of the kiln-chambers to close the ends of the tunnel, as will be readily understood. The space between the sides and bottom of the kiln-chambers and the tunnel walls and floor is closed by flexible shields 34' (Fig. 7).

Figure 1:
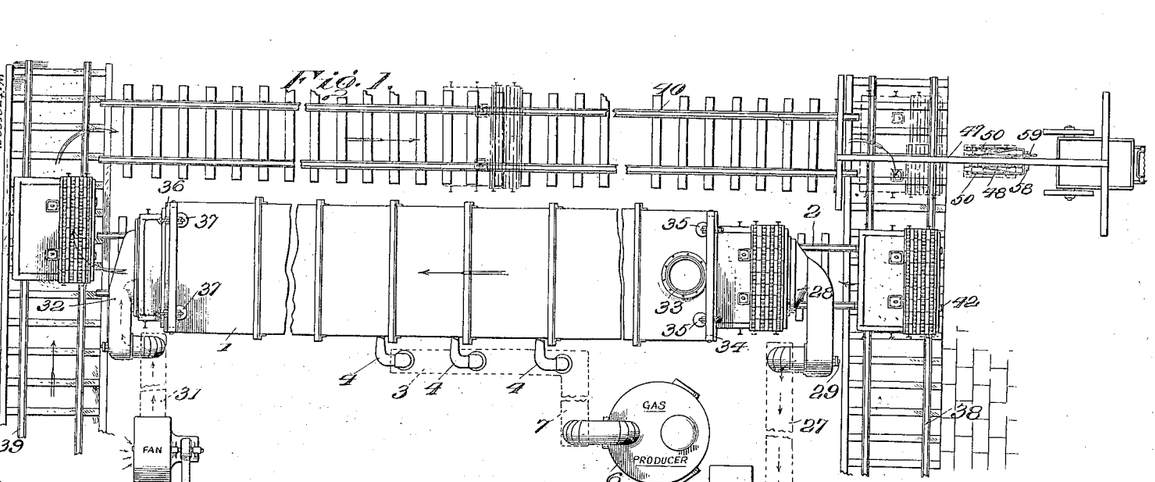
—Figure 1 is a broken plan view, and Fig. 2 a side elevation.
Figure 2:
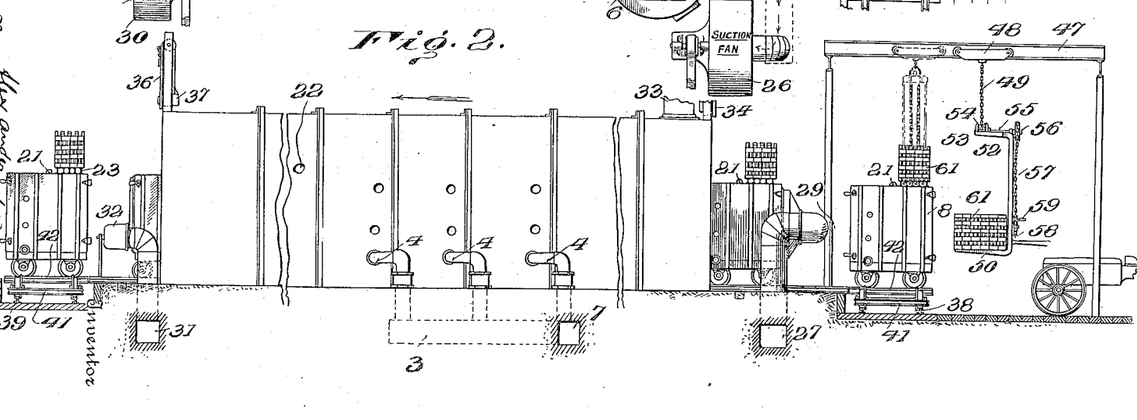

Referring to Fig. 1, 38 is a transfer track extending at right angles to the direction of the tunnel and adjacent to the initial end thereof, and on a plane below that of the track of the tunnel, as clearly shown in Fig. 2, and 39 is a like transfer track extending transversely to the tunnel and on a plane below that of the track in the tunnel, while 40 is a track preferably on the same horizontal plane as the track in the tunnel, and parallel therewith, the tracks 38 and 39 extending past the ends of the track 2 and the track 40. Upon the tracks 38 and 39 are suitable transfer trucks 41, having short tracks or rails 42 extending transversely across the trucks, which tracks or rails are so spaced as to exactly register with and form extensions of the rails of the tracks 2 and 40, so that when the trucks are placed in a position opposite the tunnel, a kiln-chamber resting upon the rails can be advanced off of the truck into the tunnel or out of the tunnel onto the truck, as the case may be, and likewise, the kilns may be readily transferred from or onto the track 40. Any suitable means may be employed for transferring the trucks from the point opposite the ends of the track 2 to the point opposite the ends of the track 40.

For the purpose of coupling the several kiln-chambers together into a continuous train when the closed end of one kiln-chamber abuts the open end of the next kiln-chamber in the train, any suitable coupling means may be provided. Preferably, a coupling which will act to draw the sections closely together and force the tongue or male member 25 into the female member 24, is employed. As here shown, such coupling device consists of an eccentrically mounted hook 43 provided with a lever arm 44 on one of the kiln-chambers, which hook engages a pivoted link 45 mounted on the adjacent kiln-chamber (see Fig. 10). Any other suitable coupling means, however, may be employed.

Preferably, the wet bricks are mounted in unit groups 46, 46, upon the supporting ribs or rails 23, and as here shown, there are two of such unit-groups 46, which two groups together constitute a complete charge for the interior of a kiln-chamber. These unit-groups may be originally stacked or constituted as such upon the tops of the kiln-chambers, but preferably the wet bricks are stacked in unit-groups of the desired size at a suitable station, and are then transferred as unit-groups from such station to their position on top of the kiln-chambers. This has the advantage that the hot kiln-chamber does not have to remain out of the tunnel during the time that would be required to stack the unit-groups on the top thereof.

The unit-groups of bricks, when the same have been dried, are transferred as unit-groups from the top of a kiln-chamber to the interior of a kiln-chamber, and preferably to the interior of the same chamber upon which they were dried, and when the bricks are burned, they are preferably removed from the kiln-chamber as unit-groups, and deposited for storage or in a wagon or other suitable carrier for removal.

Figure 8:
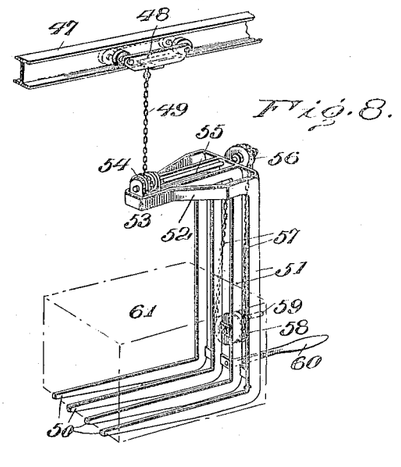
Fig. 8 is a perspective view of the transfer fork.

For the purpose of handling the bricks in unit-groups as above described, suitable means are provided for lifting the unit-groups of bricks on to and off of the supports on top of the kiln-chambers, and for inserting the unit-groups as units within, and removing them from the kiln-chambers. For this purpose, there is provided a series of vertically adjustable horizontal arms, which may be inserted between the rails or ribs 23 on top of the kiln-chambers for placing the bricks in position upon the ribs 23, and when the weight of the bricks is received by said ribs, the horizontal arms are slightly lowered and then withdrawn horizontally. Likewise, when the bricks are to be removed from the kiln-chambers, the horizontal arms are inserted in the openings or spaces between the ribs 23, and are then raised or adjusted vertically so as to lift the unit group of bricks as a whole. In the same way, the bricks are placed within the kiln-chambers by extending the horizontal arms into the open end of the kiln-chambers between the ribs 17 for supporting the bricks therein, and are then slightly lowered and withdrawn horizontally, the reverse of this movement serving to remove the bricks from the kiln-chamber. Any suitable means for effecting this function may be employed. As herein shown, there is arranged at the initial end of the tunnel 1 a suitable overhead or elevated track 47 (Figs. 2 and 8), on which travels a truck 48, from which depends a chain or cable 49. A series of horizontally extending fingers or arms 50 so spaced as to permit the said fingers or arms to enter between the ribs 23 on top of the kiln-chambers or the supporting ribs 17 within the kiln-chambers, are connected by suitable upright members 51 to an overhead horizontally extending member or members 52, the overhead members 52 and the lower arms 50 being preferably extended at approximately right-angles to the upright members 51. The whole is united into a kind of fork, by means of a suitable connecting member 53, or otherwise, at the top, so as to form a rigid carrying device or structure, and mounted on the top thereof is a windlass 54, around which chain 49 extends, which windlass is secured to a shaft 55, which in turn carries a sprocket-wheel 56, over which extends an endless chain 57, which also passes around a lower sprocket-wheel 58, operated by a crank-handle 59. By operating the crank-handle 59, the chain 49 can be wound up on the windlass 54 or unwound therefrom to raise or lower the forked carrier, which is capable of being turned in a horizontal plane around the chain 49 as a support, a suitable lever or handle 60 being provided for this purpose, or this fork or lifting device may be attached to an overhead conventional crane.

Referring to Fig. 2, the forked carrier can be elevated into the position shown in dotted lines in Fig. 2, so as to extend the forked arms 50 under the pile of dried bricks 61 on top of the kiln-chamber, and lift them therefrom as a unit-group, after which the truck 48 is run rearward to the position shown in full lines in Fig. 2, and the fork is then lowered into the position shown in said full lines, when the truck 48 may be again advanced, thereby running the unit-group of dried bricks 61 into the kiln-chamber 8 when, the forks being slightly lowered with the arms 50 in the spaces between the ribs or supports within the kiln-chamber, the unit-group of bricks comes to rest upon said ribs and the truck 48 being moved rearward, the fork is withdrawn and the second unit-group of bricks is then placed within the kiln in the same manner.

It will be readily understood that instead of the horizontal fork 51 being advanced into and withdrawn from the kiln-chamber, the fork with its load of bricks might be permitted to remain stationary, and the kiln-chamber advanced to and from the fork carrying the bricks, the result in either event being the same, viz., that the unit-group of bricks would be placed within the kiln-chamber, and such a method of operation would, therefore, be the equivalent of that in which the fork is advanced into the chamber and withdrawn therefrom as above described.

Operation: In operation, any suitable or desired number of kiln-chambers may be employed to form a train extending through the inclosed tunnel. As ordinarily employed, I prefer to make up a train of say twenty-four or more kiln-chambers, the inclosing tunnel being of such a length as to receive a train of this length, less one or more chambers which may project out from each end of the tunnel. The kiln-chambers, with dried bricks therein and wet bricks thereon, are advanced one at a time off of the trucks 41 onto the track 2 at the initial end of the tunnel, and the kiln-chambers coupled together as described, the sealing of the joints being secured by the coaction of the male and female members without the necessity of any particular labor or attention in connection therewith. A sufficient number of these kiln-chambers are thus connected together one at a time and advanced into the tunnel until the forward kiln-chamber has reached the first fuel supply nozzle or means at the fuel supply station 3, when it is connected by such nozzle to the supply conduit, so that the fuel therefrom is permitted to enter the distributing duct or passage 5, and from thence supplied to the combustion chamber 11 through the ports 12. The train remains at rest for a suitable period of time, which I find to be approximately from 30 minutes to one hour, according to the nature of the clay, after which the fuel nozzle is disconnected from the forward kiln, an additional kiln is attached to the rear end of the train at the initial end of the tunnel, and the entire train advanced so as to bring the forward kiln opposite the second fuel supply nozzle, when it and the kiln-chamber immediately to the rear thereof are connected to the second and first nozzles respectively, and the train remains at rest, and the burning in the two forward chambers proceeds simultaneously. After a proper time, the train is again advanced the length of one kiln-chamber, another kiln-chamber is added to the rear, and the forward three kiln-chambers are then connected to the three fuel supply nozzles, and the burning operation repeated. At the expiration of this burning operation, the forward kiln-chamber will have the bricks therein completely burned. The train is then advanced the length of one kiln-chamber, and the three kiln-chambers opposite the combustion station are connected with the fuel supply nozzles and the burning operation repeated. This is continued until there is a train of kiln-chambers extending entirely through the tunnel, so that when the train is advanced the length of one kiln-chamber, there is one kiln pushed from the exit end of the tunnel, and another one added at the initial end thereof.

Each of the kiln-chambers enters the tunnel preferably with unit-groups of wet bricks on top thereof, and the flues or air outlets 20 are closed by the closures or covers 21, and the suction fan 26 is in operation so as to cause a suction draft from the fuel supply station rearward through the kiln-chambers. This causes the gases of combustion as they pass out of the combustion chambers to extend into the space at the crown of the kiln-chamber and to descend uniformly downward through the spaces between the dried bricks within the kiln-chamber, and, when the flue 15 is employed, also causes gases of combustion to pass through the flues 13, 15 and 16, and also out through the lower opening 10 to the space beneath the bricks. The gases whether passing to the crown at the top or taking any other course, by this means are uniformly distributed throughout the kiln-chamber, so that all the bricks therein are subjected to a uniform burning action. After passing downward around and between the bricks, the hot products of combustion pass through the flues 12 at the bottom of the kiln-chamber, and enter the combustion chamber 11 of the next kiln-chamber in the rear, and so on throughout the length of the train, until they reach the hood 28, where they are drawn off by the suction draft. It will thus be perceived that the bricks upon the top of the kiln-chambers are effectively shielded from the action of the products of combustion, which latter come only in contact with the dried bricks within the kiln-chambers.

After the kiln-chambers one by one have passed the final fuel supply nozzle at the combustion station 3, the flues 20 are uncovered or opened, and the forced draft from the fan 30 forces a cooling draft of air through the spaces between the hot bricks, serving to cool the same, the air in turn becoming heated as the result of the heat absorbed from the bricks, after which the greater portion of it passes outward through the air outlets or flues 20 into the exterior space of the tunnel, and through the unit-groups of bricks on top of the kiln-chambers. The kiln-chambers are thus advanced step by step through the tunnel, and when the foremost kiln-chambers, say the forward two, approach the exit end of the tunnel, the air outlet flues 20 are preferably again closed, thus preventing the cold air which has only passed through the kiln-chambers containing bricks that are almost cooled from coming in contact with the dry bricks on top of the kiln-chambers. These dry bricks on top of the kiln-chamber at this point are quite hot, and it is desirable to retain some of the heat in the bricks until they are placed within the hot kiln-chamber, and it also is desirable to bring this air to a higher temperature by passing same through chambers of a higher temperature before allowing such air to enter the drying chamber, as hereinafter described.

During the process of combination, not only the bricks within the kiln-chambers become highly heated and burned, but the side, top and bottom walls of the kiln-chambers themselves become highly heated and radiate a very considerable amount of heat from their exterior surfaces, which is recovered and utilized for heating up the drying chamber or the tunnel exterior to the kiln-chamber, and this heat, in connection with the air driven in by the forced draft over the hot bricks and through the air outlets 20 into the tunnel, serves to effectively dry the bricks which were wet at the initial end of the tunnel, and this air, with the moisture which is absorbed from the bricks, then passes outward through the stack 33.

When the foremost kiln-chamber makes its exit from the tunnel, the bricks on top thereof are dry but not cold. The bricks within the kiln-chamber are burned and comparatively cool, and the kiln-chamber itself, by reason of its thick walls, is yet quite hot. This kiln-chamber is run upon the truck 41 at the exit end of the tunnel and shifted onto the track 40, and thence onto the truck 41 on the track 48. The burned bricks may be taken from the kiln-chamber at any suitable point, but preferably they are removed therefrom at the point where the kiln-chamber passes from the track 40 to the truck on the track 48, by means of the lifting fork or fingers 50, and deposited in a wagon or other suitable carrier. The hot dried bricks on top of the kiln-chamber are then removed by the fork 50, and placed within the kiln-chamber, and wet bricks, preferably in unit-groups, are placed on top of the kiln-chamber; the latter is then advanced to the initial end of the tunnel, attached to the train, and reinserted into the tunnel while the kiln-chamber and the bricks therein still retain a very considerable amount of heat.

As the kiln-chambers pass from the initial end of the tunnel forward therethrough to the exit end of the tunnel, the bricks are passed first through a heating up zone, the heat being derived from the products of combustion drawn rearward through the train, and by the time they arrive at the burning station, they are highly heated, and thus the time consumed in the burning function itself is shorter than would be the case if the bricks reached this station in a cold condition. The bricks are then passed through the burning zone, and after being burned, they are then passed forward through that portion of the tunnel extending from the burning station to the exit end thereof, which portion constitutes a cooling zone, the bricks being cooled by the forced draft of cold air entering at the forward end of the train. Simultaneously with this passing of the bricks within the kiln-chambers, through a heating up, a burning and a cooling zone, the wet bricks on top of the kiln-chamber are passed rearward through the tunnel in a drying atmosphere derived from the waste heat radiated from the kiln-chambers constituting the train and that radiated from the burned bricks and absorbed by the column of cooling air under pressure. And during all this time, the bricks on top of the kiln-chambers have been effectively shielded from the products of combustion. Moreover, by passing the bricks to be dried through a gradually increasing temperature and then through a gradually decreasing temperature, it is possible to raise the drying bricks to a very high temperature, and still have the bricks at the time when they make their exit from the tunnel sufficiently cool so that contact with the external atmosphere will not injuriously affect the same. Without the gradually decreasing temperature step, it would not be practicable to employ so high, and hence so effective, a drying temperature as I am enabled to utilize. This is a matter of much importance in the practical operation of the system.

It will be noted that the opening in each kiln-chamber through which bricks are inserted and removed from such chamber, is closed in forming the train without the employment of any material other than that forming a part of the kiln-chamber itself, or without any additional labor other than that incident to coupling the kiln-chambers together. Furthermore, after the bricks have been burned the kiln-chamber is opened for the removal of the bricks by simply detaching the kiln-chamber from the train. The importance of this lies in the fact that the labor and material heretofore necessarily incident to closing a kiln-chamber of a series for burning and in opening the same to remove the burned bricks, are entirely eliminated. Moreover, this is all accomplished in such a manner that any possible leakage of cold air into the kiln-chamber through the joint must necessarily be drawn through the combustion-chamber and be heated by the products of combustion before coming in direct contact with the bricks, thus avoiding the injurious effect that the cold air would have if it came in contact with the highly heated bricks.

What is claimed is:—

1. In an apparatus of the character described, the combination of a tunnel, a train of separable independent kiln-chambers movable through said tunnel, combustion chambers in said kiln-chambers, a fuel supply station intermediate the ends of said train, and means at said station for supplying fuel in turn to said combustion chambers.

2. In an apparatus of the character described, the combination of a movable train of separable independent kiln-chambers, flues connecting said kiln-chambers, combustion chambers in said kiln-chambers, a fuel supply station intermediate the ends of said train, and means at said station for supplying fuel in turn to said combustion chambers.

3. In an apparatus of the character described, a plurality of movable kiln-chambers open at one end and having a wall closing the other end, means uniting said kiln-chambers into a train with the open end of one kiln-chamber abutting the closed end of the next adjacent kiln-chamber, flues connecting said kiln-chambers, a fuel supply station intermediate the ends of said train, and means at said station for supplying fuel in turn to said kiln-chambers.

4. In an apparatus of the character described, the combination of a movable train of separable independent kiln-chambers, flues connecting said kiln-chambers, combustion chambers in said kiln-chambers, a fuel station intermediate with the ends of said train, means at said station for supplying fuel to said combustion chambers, and means creating an artificial draft connected to one end of said train.

5. In an apparatus of the character described, the combination of a movable train of separable independent kiln-chambers, flues connecting said kiln-chambers, combustion chambers in said kiln-chambers, a fuel supply station intermediate with the ends of said train, means at said station for supplying fuel to said combustion chambers, and means creating an artificial draft connected to each end of said train.

6. In an apparatus of the character described, a tunnel having a track or way therethrough, a train of separable kiln-chambers movable on said track or way, flues connecting said kiln-chambers, outlets through the walls of said kiln-chambers, means for closing said outlets, combustion chambers in said kiln-chambers, a fuel supply station intermediate with the ends of said train, and means for supplying fuel in turn to said combustion chambers.

7. In an apparatus of the character described, a plurality of movable kiln-chambers open at one end and having a wall closing the other end, a flash wall adjacent said end wall and together therewith forming a combustion chamber, a flue extending through each end wall into said combustion chamber, means uniting said kiln-chambers into a train with the open end of one kiln-chamber abutting the closed end of the next adjacent kiln-chamber, and means supplying fuel to said combustion chambers.

8. In an apparatus of the character described, a tunnel, a train of independent kiln-chambers movable through said tunnel, flues connecting said kiln-chambers, combustion chambers in said kiln-chambers, means supplying fuel to said combustion chambers, openings through the walls of said kiln-chambers into said tunnel, means for closing said openings, a suction draft connected to one end of said train, and a forced draft connected to the other end of the train.

9. In an apparatus of the character described, a train of movable independent kiln-chambers connected by flues and having combustion chambers therein, means supplying fuel to said combustion chambers, a suction draft connected to one end of said train, and a forced draft connected to the other end of the train.

10. In an apparatus of the character described, a train of movable independent kiln-chambers connected by flues and having combustion chambers therein, means at a central station supplying fuel to said combustion chambers, a suction draft connected to one end of said train, and a forced draft connected to the other end of the train.

11. In an apparatus of the character described, a movable kiln-chamber open at one end and having an end wall closing the other end with a flue therethrough, a truck supporting said kiln-chamber, a combustion chamber within said kiln-chamber, a flue or air outlet in the top of said kiln-chamber, and means for supporting bricks to be burned within said kiln-chamber, and means for supporting bricks to be dried on the top of said kiln-chamber.

12. In an apparatus of the character described, a tunnel, a train of independent kiln-chambers having air-outlet openings and movable through said tunnel, means on and exterior to said kiln-chambers for supporting bricks to be dried, and means forcing air through said kiln-chambers and through the air outlets therein, whereby the bricks are dried.

13. In an apparatus of the character described, a tunnel, a train of independent kiln-chambers movable through said tunnel, combustion chambers in said kiln-chambers, flues connecting the kiln-chambers in the train, means on and exterior to said kiln-chambers for supporting bricks to be dried, air-outlet openings in said kiln-chambers, a combustion station, means closing said air-outlet openings in the train to the rear of said combustion station, and means forcing air into one end of said train and out through the unclosed air-outlet openings into the tunnel, whereby the bricks on the kiln-chambers are dried while shielded from the products of combustion.

14. In an apparatus of the character described, a closed tunnel, means simultaneously passing dried bricks and wet bricks through said tunnel, means for burning the dried bricks during said passage, means shielding the wet bricks from the products of combustion, and means forcing air over the burned bricks to cool the same and then over the wet bricks to dry them.

15. In an apparatus for burning, cooling and handling bricks, the combination of a series of movable and separable kiln-chambers, each having an opening in one end and provided with refractory floors having longitudinal flues separated by ribs, and a lifting device for the bricks in said kiln-chambers comprising a series of lifting fingers adapted to be inserted in the flues for lifting the bricks horizontally in and out through the opening in the end of the kiln-chambers.

16. In an apparatus of the character described, a kiln-chamber open at one end and having a series of longitudinal ribs and intermediate flues or spaces, and a lifting device provided with a series of lifting fingers adapted to be inserted in the flues or spaces for lifting a unit of bricks into or out through the opening in the end of the kiln-chamber, said kiln-chamber being adapted to be associated with another kiln-chamber to form a complete burning inclosure.

17. In an apparatus of the character described, a kiln-chamber having an opening at one end and deflecting walls within the kiln-chamber, a floor provided with ribs and intermediate flues or spaces, and a lifting device provided with a series of lifting fingers adapted to be inserted in the flues for lifting a unit of bricks into and out of the kiln-chamber through the opening in one end thereof.

18. In an apparatus of the character described, a crown kiln-chamber having a series of ribs and intermediate flues or spaces and an opening, and a lifting device comprising a series of lifting members, a horizontal arm spaced from the lifting members sufficiently to pass over the crown of the kiln-chamber when loading or unloading the bricks from said kiln-chamber, and means for raising, lowering and manipulating said lifting device for loading and unloading the bricks horizontally from said kiln-chamber.

19. In an apparatus of the character described, a series of movable kiln-chambers separably connected together and each having a deflecting wall and an opening, and a series of longitudinal ribs and intermediate spaces, a lifting device for the bricks in said kiln-chambers comprising a series of lifting members adapted to be inserted in the spaces between the ribs underneath the bricks, and means for moving said lifting device in and out through the opening.

20. In an apparatus of the character described, a series of crown kiln-chambers, each open at one end and provided with a deflecting wall therein, said kiln-chambers each having longitudinal brick-supporting ribs and intermediate spaces forming flues, and a lifting device comprising a series of lifting fingers adapted to be inserted horizontally under the bricks supported upon the ribs for moving said bricks into and out of the kiln-chambers.

21. In an apparatus of the character described, a series of separable kiln-chambers, each provided with a flash wall, and apparatus for handling the bricks in unit groups, said apparatus comprising lifting members adapted to be inserted horizontally into the kiln-chambers, and means for operating said lifting members.

22. In an apparatus of the character described, a series of movable kiln-chambers separably connected together, each of said kiln-chambers being provided with a deflecting wall spaced from one end thereof to form a combustion chamber between the end of the kiln-chamber and said wall, the lower part of each of said kiln-chambers being provided with ribs and intermediate spaces, and a lifting device provided with lifting members adapted to be inserted in said spaces for lifting the bricks bodily into and out of said kiln-chambers horizontally.

23. In an apparatus of the character described, a series of kiln-chambers each having an open end and a closed end, the latter being provided with a draft opening, a deflecting wall in each of said kiln-chambers, said wall being spaced from the closed end of the kiln-chamber a sufficient distance to provide a combustion chamber, ribs or brick supports in the lower part of each of said kiln-chambers, said ribs being spaced apart to form intermediate flues, means for introducing fuel into said combustion chambers, and apparatus for handling the bricks in units, provided with lifting fingers adapted to be inserted in said flues underneath the bricks, for removing the latter out through the open end of the kiln-chamber.

24. In an apparatus of the character described, a series of movable kiln-chambers separably connected together and each having an open end, a closed end and a deflecting wall spaced from the closed end to form a combustion chamber, longitudinally spaced ribs or brick supports in the lower part of said kiln-chambers, the spaces between the ribs forming ducts, means for introducing fuel into the combustion chamber and apparatus for handling the bricks in units into and out through the opening in the ends of the movable kiln-chambers.

25. An apparatus for burning and cooling bricks comprising a series of movable and separable intercommunicable kiln-chambers, means for introducing fuel into said kiln-chambers, and for repeatedly deflecting the draft in an upward and downward course through the said kiln-chambers.

26. In an apparatus of the character described, a series of movable and separable kiln-chambers connected together to form a continuous train, each kiln-chamber having an open and a closed end provided with draft openings, a deflecting wall in each of said kiln-chambers, said wall being spaced from the closed end to form a combustion chamber, ribs or brick supports in the lower part of each of said kiln-chambers, said ribs being spaced apart to form heat ducts, in combination with a lifting device, and means for operating the same, said ducts permitting the insertion of the lifting device.

27. In an apparatus for burning and cooling bricks, a series of movable and separable kiln-chambers designed to be passed progressively through a heating up, burning and cooling zone, each of said kiln-chambers being provided with an open end and a closed end having a draft opening therein, and a flash wall within each kiln-chamber spaced from the end of the kiln-chamber to provide a combustion chamber between them.

28. In an apparatus for burning and cooling bricks, a series of movable and separable inclosed kiln-chambers, each of said kiln-chambers being provided with an open end and a closed end having a draft opening therein, a flash wall within each kiln-chamber to provide a combustion chamber, and means for introducing fuel into said combustion chamber.

29. In an apparatus for drying, burning and cooling bricks, a series of movable and separable open ended kiln-chambers for containing bricks to be burned and cooled, means for supporting bricks to be dried upon the tops of said kiln-chambers, an inclosure for said bricks to be dried, and means for introducing fuel into some of said kiln-chambers.

30. In an apparatus for burning and cooling bricks, a series of movable and separable kiln-chambers adapted to be passed progressively through a tunnel, each of said kiln-chambers being provided with an open end and a closed end having a draft opening therein, a flash wall within each kiln-chamber spaced from the end of the kiln-chamber to provide a combustion chamber between them, and apparatus for handling the bricks in unit groups, said apparatus adapted to be moved in and out through the open end of the kiln-chamber.

31. In an apparatus for drying, burning and cooling bricks, a series of movable and separable open ended kiln-chambers for containing bricks to be burned and cooled, means for supporting bricks to be burned and cooled, means for supporting bricks to be dried upon the tops of said kiln-chambers, an inclosure for said bricks to be dried, means for introducing fuel into some of said kiln-chambers, and apparatus for handling the bricks in unit groups, said apparatus comprising a lifting device for moving the bricks horizontally into and out of said kiln-chambers.

32. In an apparatus for burning, cooling and handling bricks, a series of movable and separable inclosed kiln-chambers each of said kiln-chambers having an open end and a closed end provided with a draft opening, each of said kiln-chambers being provided with longitudinal ribs upon the floor line thereof, said ribs being spaced apart to form channels for heat ducts, and means for handling the bricks in unit groups comprising a lifter having a series of lifting fingers adapted to be inserted in said channels for supporting the bricks bodily and for lifting them horizontally out and into said kiln-chambers.

33. In an apparatus for drying, burning, cooling and handling bricks, a series of movable and separable open ended kiln-chambers adapted to be passed progressively through a tunnel spaced from the top of said kiln-chambers to provide a drying chamber, means for supporting bricks to be dried upon said kiln-chambers and means for transferring and handling the bricks in unit groups.

34. An apparatus for burning and cooling bricks, comprising a series, the units of which are movable and independent separable kiln-chambers, each having one open end, means for introducing fuel into said kiln-chambers in turn, and means in each kiln-chamber for deflecting the body of the draft.

35. An apparatus for burning, cooling and drying bricks comprising a series of movable and separable open ended kiln-chambers, means for repeatedly deflecting draft through the bricks in said kiln-chambers, and means for drying bricks above said kiln-chambers.

36. An apparatus for burning, cooling and drying bricks comprising a series of movable and separable open ended kiln-chambers inclosed within a tunnel spaced from said kiln-chambers to provide a drying chamber, means for repeatedly deflecting the draft through the bricks, means for drying bricks above the kiln-chambers, and means for handling and transferring the bricks in unit groups.

37. An apparatus for burning and cooling bricks comprising a series of movable and separable kiln-chambers each provided with an open end and a closed end having a draft opening, a deflecting wall in each of said kiln-chambers, means for introducing fuel into said kiln-chambers, and means for handling the bricks in unit groups, said means comprising lifting members adapted to be inserted into and withdrawn from the open ends of the kiln-chambers.

38. An apparatus for burning and cooling bricks comprising a series of independent open ended connected intercommunicable and separable kiln-chambers, each provided with a deflecting wall therein.

39. An apparatus for drying, burning and cooling bricks comprising a series of open ended connected intercommunicable and separable kiln-chambers, each provided with a deflecting wall therein, and means for drying bricks upon the tops of said kiln-chambers.

40. An apparatus for drying, burning and cooling bricks comprising a series of connected intercommunicable and separable open ended kiln-chambers, each provided with a deflecting wall therein, and means for drying bricks upon the tops of said kiln-chambers, said kiln-chambers adapted to be passed through an inclosing tunnel spaced from the kiln-chambers to provide a drying chamber.

41. An apparatus for burning, cooling and drying bricks comprising a series of intercommunicable and separable kiln-chambers, a tunnel through which said kiln-chambers are adapted to be passed, said tunnel being spaced from the tops of said kiln-chambers to provide a drying chamber, each of said kiln-chambers being provided with an open end and a closed end provided with a draft opening, deflecting walls in each of said kiln-chambers, means for introducing fuel into said kiln-chambers, each of said kiln-chambers having ribs and intermediate spaces forming flues in the floor line of said kiln-chambers.

42. An apparatus for burning, cooling and drying bricks comprising a series of intercommunicable and separable crown kiln-chambers, a tunnel through which said kiln-chambers are adapted to be passed, said tunnel being spaced from the tops of said kiln-chambers to provide a drying chamber, each of said kiln-chambers being provided with an open end and a closed end provided with a draft opening, deflecting walls in each of said kiln-chambers, means for introducing fuel into said kiln-chambers, each of said kiln-chambers having ribs and intermediate spaces forming flues in the floor line of said kiln-chambers, and means for lifting and transferring the bricks.

43. An apparatus for burning, cooling and drying bricks simultaneously comprising apparatus for carrying bricks through a heating up and cooling zone, means for supporting bricks on the top of said apparatus for drying said bricks, and a tunnel inclosing said apparatus and spaced therefrom to provide a drying chamber.

44. An apparatus for burning, cooling and drying bricks comprising a series of movable and separable open ended kiln-chambers inclosed within a tunnel spaced from said kiln-chambers to provide a drying chamber, means for repeatedly deflecting the draft through the bricks, means for drying bricks above the kiln-chambers and means for handling the bricks in unit groups 45. An apparatus for drying, burning and cooling bricks comprising a series of connected intercommunicable and separable kiln-chambers, each provided with an open end and means for drying bricks upon the tops of said kiln-chambers, said kiln-chambers adapted to be passed through an inclosing tunnel spaced from the kiln-chambers to provide a drying chamber.

46. In an apparatus for drying, burning and cooling bricks, a plurality of separate, movable kiln-chambers, means for supporting wet bricks on the tops of the chambers, means for supporting dried bricks within the chambers, means for connecting the chambers into a train, a tunnel through which said train is passed, means creating a heating up, a burning and a cooling zone within the train, and means creating a heating up and drying atmosphere within the tunnel exterior to the train, whereby the dried bricks are burned within the train and the wet bricks are dried exterior to the train.

47. In an apparatus for drying, burning and cooling bricks, a plurality of separable, movable kiln-chambers, means for supporting wet bricks in the exterior of said chambers, means for supporting dried bricks within the chambers, means connecting the chambers into a train, a tunnel through which said train is passed, means creating a heating up, a burning and a cooling zone within the train, flues leading through the walls of the chambers into the tunnel, and means for closing said flues while the bricks therein are passing through the heating up and burning zones, and opening said flues when the bricks therein are passed through the cooling zone, whereby the dried bricks are burned and the wet bricks are dried by the radiant heat from the chambers when the bricks are within the heating and burning zones, and the direct heat from the burnt bricks in the cooling zone.

48. In an apparatus for burning and cooling bricks, a series of independent, separable kiln-chambers on wheels, means for creating within said series of chambers a heating up, a burning and a cooling zone, flues connecting the chambers, and means for introducing fuel into and distributing the same in said chambers.

49. In an apparatus for burning and cooling bricks, a tunnel, a plurality of independent, separable kiln-chambers on wheels, means for connecting said chambers into a train to be passed through said tunnel, and means for creating a heating up, a burning and a cooling zone within said train, flues between the chambers constituting the train, and means for introducing fuel into one or more of said chambers intermediate the ends of the train.

50. In an apparatus for burning and cooling bricks, a tunnel, a plurality of independent, separable kiln-chambers on wheels, means connecting said chambers into a train to be passed through said tunnel, means creating a heating up zone, a burning zone and a cooling zone within said train, flues connecting the chambers of the train, means for introducing fuel into and distributing the same in one or more chambers intermediate the ends of the train, and means for producing a suction draft through said chambers.

51. In an apparatus for burning and cooling bricks, a tunnel, a plurality of independent, separable kiln-chambers on wheels, means connecting said chambers into a train to be passed through said tunnel, means creating a heating up zone, a burning zone and a cooling zone within said train, flues connecting the chambers of the train, means for introducing fuel into one or more chambers intermediate the ends of the train, means for producing a suction draft through said chambers at the rear end of the train, and means for producing a forced draft at the forward end of the train.

52. In an apparatus for drying, burning and cooling bricks, a plurality of separable, movable kiln-chambers, means for connecting the chambers into a train, means for supporting wet bricks on top of the chambers, means for supporting dried bricks within the chambers, means creating a heating up, a burning and a cooling zone in the chambers, and means directing the waste heat among the bricks on top of the chambers, whereby the dried bricks are burned and the wet bricks are dried by the waste heat from the burning operation.

53. A plurality of movable kiln-chambers open at one end and closed at the other end except for flues, means connecting the chambers into a train with the closed end of one chamber abutting the open end of the next chamber in the series, and means creating a heating up, a burning and a cooling zone within the train of chambers.

54. In an apparatus of the character described, a train of separable kiln-chambers with flues connecting said chambers, means supplying fuel to and distributing said supply in one or more chambers in the train intermediate the ends of the train, and means for causing a draft through the train to cool the burned brick, to support the combustion of the fuel, and to direct the products of combustion among the bricks for heating up the same.

55. In an apparatus for burning bricks, a plurality of independent, movable, connectible kiln-chambers, means connecting said chambers into a train, means for introducing fuel into the train, and means for causing a continuous up and down draft through the several chambers in the train.

56. In an apparatus for burning bricks, a plurality of movable, separable kiln-chambers, a combustion chamber in each kiln-chamber, means uniting said kiln-chambers into a train with the joints of union immediately in front of each kiln-chamber, means directing a draft rearward through said train whereby any leakage at the joints of union is directed through a combustion chamber before coming in contact with the bricks in the chambers.

57. In an apparatus for burning bricks, a plurality of separable movable kiln-chambers, means for connecting the chambers into a train, combustion chambers in the kiln-chambers, fuel-distributing ducts in communication with each combustion chamber, and means for supplying fuel to said fuel-distributing ducts.

58. In an apparatus of the character described, the combination of a series of closed kiln-chambers separably united into a train, flues connecting the said chambers whereby a draft may be established through the train, a source of heat, and means uniformly distributing the heat throughout the charge of bricks contained in the kiln-chambers.

59. In an apparatus of the character described, the combination of a series of closed kiln-chambers separably united into a train, flues connecting the several chambers of the train whereby a draft may be maintained through said several chambers, means supplying heated products of combustion to a chamber intermediate the ends of the train, means distributing the heated products of combustion uniformly throughout the charge of bricks contained in a plurality of chambers of said train whereby the bricks are burned, supports for charges of bricks carried upon the exteriors of said kiln-chambers, and means directing a current of air first over the hot burned bricks and then over said bricks exterior to the chambers.

60. In an apparatus of the character described, a series of closed kiln-chambers separately united into a train, flues connecting said chambers whereby a draft can be directed through a plurality of chambers in the train, means supplying heated products of combustion to a chamber intermediate the ends of the train, means distributing said heated products of combustion uniformly throughout the charge of bricks in said kiln-chamber whereby the bricks are burned, and like means uniformly distributing said heated products of combustion throughout the charges of bricks in the kiln-chambers intermediate said burning kiln and one end of the train whereby the bricks are heated up before burning, and means passing an air current over the burned bricks whereby the same are cooled.

61. In an apparatus of the character described, a series of closed kiln-chambers separably united into a train, flues connecting said kiln-chambers whereby a draft may be directed through the several chambers in the train, means for burning fuel in one of the kiln-chambers intermediate the ends of the train, means directing heated products of combustion uniformly through the charge of bricks in said chamber, and then uniformly throughout the charges of bricks in the several kiln-chambers between said point of combustion and one end of the train whereby bricks are first heated up and then burned, means supporting charges of bricks to be dried upon the exterior of the kiln-chambers in the train, means directing a current of cooling air over the burned bricks whereby the bricks are cooled and said air is heated, and means directing said heated air over the charges of bricks to be dried on the exterior of said kiln-chambers.

62. In an apparatus of the character described, a kiln-chamber having an opening for the insertion and removal of bricks, and means carried by an adjoining kiln-chamber for closing said opening.

63. In an apparatus of the character described, a series of movable connected separable intercommunicating kiln-chambers each having an open end and a detachable wall closing said end opening.

64. In an apparatus of the character described, a series of connected separable kiln-chambers each having an open end for the insertion and removal of bricks, and each kiln-chamber having means for simultaneously closing and sealing the said open end of the adjoining kiln-chamber when united into the series.

65. In an apparatus of the character described, a series of connected separable kiln-chambers provided with draft openings, and each chamber carrying one end closure for an adjoining kiln-chamber, whereby each kiln-chamber is opened at one end when the series of chambers are separated.

66. In an apparatus of the character described, a series of connected separable closed kiln-chambers each connected to its adjoining chambers by suitable flues and each having fuel-supply openings, and each chamber carrying one end closure for an adjoining kiln-chamber, whereby each chamber is opened at one end when it is separated from the series of chambers.

67. In an apparatus of the character described, a tunnel, a train of separable independent kiln-chambers movable through said tunnel, fuel-distributing flues in said chambers, a fuel-supply station intermediate the ends of said train, and means at said station for supplying fuel in turn to said fuel-distributing flues.

68. In an apparatus of the character described, a tunnel, a train of separable independent kiln-chambers movable through said tunnel, combustion chambers in said kiln-chambers, fuel-supply flues communicating with said combustion chambers, a fuel-supply station intermediate the ends of said train, and means at said station for supplying fuel in turn to said distributing flues.

69. In an apparatus of the character described, a movable train of separable independent kiln-chambers, flues connecting said kiln-chambers, combustion chambers in said kiln-chambers, fuel-distributing flues communicating with said combustion chambers, a fuel supply station intermediate the ends of the train, and means at said station for supplying fuel in turn to said distributing flues.

70. In an apparatus of the character described, a plurality of movable kiln-chambers each open at one end and having a wall closing the other end, a fuel distributing flue, a flash wall adjacent said end wall and together therewith forming a combustion chamber, a flue extending through each end wall into said combustion chamber, means uniting said kiln-chambers into a train with the open end of each kiln abutting the closed end of the next adjacent, and means supplying fuel to said fuel distributing flue.

71. In an apparatus of the character described, a kiln-chamber provided with an opening in one end thereof, a floor having ribs separated by intervening spaces, a fuel distributing flue, and a lifting device provided with a series of lifting fingers adapted to be inserted into the spaces between the ribs for lifting a unit of bricks into or out of the kiln-chamber through the opening in the end thereof.

72. In an apparatus of the character described, a series of movable kiln-chambers separably connected together and each having an open end, a closed end and a deflecting wall spaced from the closed end to form a combustion chamber, longitudinally spaced ribs or brick supports in the lower part of said kiln-chambers, the spaces between the ribs forming open-topped flues, means for introducing fuel into the combustion chamber, and apparatus for handling the bricks in unit groups through the open ends of said kiln-chambers.

73. In an apparatus of the character described, a series of connected kiln-chambers each provided with brick supporting ribs in its bottom and spaces between said ribs, and each chamber also having suitably spaced brick-supporting ribs on the top thereof for supporting bricks to be dried.

74. In an apparatus of the character described, a series of connected kiln-chambers, each chamber being provided with a combustion chamber, brick supporting ribs in the bottom of said chambers with intervening spaces between said ribs, and suitably spaced brick supporting ribs on the top of said chambers.

75. In an apparatus of the character described, a series of connected kiln-chambers each provided with a combustion chamber, a fuel-distributing flue communicating with said combustion chamber, and suitably spaced brick-supporting ribs in the bottom of the chamber, and suitably spaced brick-supporting ribs on the top of said chamber.

In testimony whereof I have signed this specification in the presence of two subscribing witnesses.

ALEXANDER A. SCOTT.

Witnesses:
RALPH L. SCOTT,
WILLARD H. HARTING.